United States Patent
Miyake et al.

(10) Patent No.: US 10,059,178 B2
(45) Date of Patent: Aug. 28, 2018

(54) TAILGATE STRUCTURE

(71) Applicant: HONDA MOTOR CO., LTD., Tokyo (JP)

(72) Inventors: Yoshinori Miyake, Saitama (JP); Masaru Takata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 15/371,249

(22) Filed: Dec. 7, 2016

(65) Prior Publication Data

US 2017/0174057 A1  Jun. 22, 2017

(30) Foreign Application Priority Data

Dec. 16, 2015  (JP) .................................. 2015-245064

(51) Int. Cl.
| | |
|---|---|
| *B60J 5/10* | (2006.01) |
| *B60S 1/04* | (2006.01) |
| *B60S 1/58* | (2006.01) |
| *B60J 5/04* | (2006.01) |

(52) U.S. Cl.
CPC ............. *B60J 5/107* (2013.01); *B60S 1/0441* (2013.01); *B60S 1/583* (2013.01); *B60J 5/0433* (2013.01)

(58) Field of Classification Search
CPC ... B60J 5/107; B60J 5/433; B60J 5/042; B60J 5/0422; B60S 1/583; B60S 1/0441
See application file for complete search history.

(56) References Cited

U.S. PATENT DOCUMENTS

| | | | | |
|---|---|---|---|---|
| 8,550,536 B2 * | 10/2013 | Gachter | ................... | B60J 5/107 296/146.8 |
| 8,991,898 B2 * | 3/2015 | Iwano | ................... | B60J 5/0429 296/146.6 |
| 2002/0024234 A1 * | 2/2002 | Ishikawa | ................ | B60J 5/0416 296/146.8 |
| 2008/0030047 A1 * | 2/2008 | Munenaga | ............... | B60J 5/101 296/146.6 |
| 2010/0102589 A1 * | 4/2010 | Miyake | .................... | B60J 5/107 296/146.8 |
| 2011/0074179 A1 * | 3/2011 | Kuntze | .................... | B60J 5/107 296/146.6 |
| 2014/0210230 A1 * | 7/2014 | Iwano | .................... | B60J 5/0429 296/146.6 |

FOREIGN PATENT DOCUMENTS

| | | |
|---|---|---|
| JP | 2006-116997 | 5/2006 |
| JP | 2010-159037 | 7/2010 |
| JP | 2015-058808 | 3/2015 |

OTHER PUBLICATIONS

English translation of JP2015058808.*
Japanese Office Action with English Translation dated Sep. 12, 2017, 8 Pages.

* cited by examiner

*Primary Examiner* — Justin B Rephann
(74) *Attorney, Agent, or Firm* — Rankin, Hill & Clark LLP

(57) ABSTRACT

A tailgate structure is provided that includes: a tailgate that is made of resin and is arranged in an opening of a vehicle body; a wiper that wipes a glass arranged in the tailgate; and a lock device that fixes the tailgate to the vehicle body by being engaged with the opening in a state that the tailgate is closed, wherein the wiper is connected with the lock device by a reinforcing member.

10 Claims, 6 Drawing Sheets

TAILGATE STRUCTURE

CROSS REFERENCE TO RELATED APPLICATION

This application claims the benefit of priority to Japanese Patent Application No. 2015-245064, filed on Dec. 16, 2015, the disclosures of all of which are hereby incorporated by reference in their entireties.

BACKGROUND OF THE INVENTION

Field of the Invention

The present invention relates to a tailgate structure, especially, a tailgate structure which prevents tailgate outfitting components from scattering to protect passengers.

Description of the Related Arts

As a related structure of a vehicle body, a resin rear gate structure is known which includes reinforcing hinges and sides arranged at four corners around an opening, and a reinforcing latch arranged at a lower end of a rear gate.

In such a configuration, reinforcing members are arranged between each reinforcing hinge and each reinforcing side, between reinforcing sides, and between each reinforcing sides and the reinforcing latch, to secure rigidity sufficiently around the opening of the rear gate and rigidity against collision load on the reinforcing latch at the time of closing the rear gate, for preventing that resin material is cracked and a piece of luggage is thrown away due to cracking and/or scattering of a resin material (see Japanese Patent Application Publication No. 2006-116997, for example).

SUMMARY OF THE INVENTION

However, in such a related tailgate configuration, a heavy functional component such as a wiper is mounted only on the tailgate. Therefore, when the tailgate is subjected to load input, the wiper may be separated from the tailgate to fall inside or outside a vehicle.

The present invention provides a tailgate structure which, even if the resin tailgate is subjected to load input, prevents a wiper from being separated from a tailgate to fall inside or outside a vehicle so that passengers can be protected, and avoids the rear wiper from scattering outside the vehicle.

One aspect of the present invention is to provide a tailgate structure including: a tailgate that is made of resin and is arranged in an opening of a vehicle body; a wiper that wipes a glass arranged in the tailgate; and a lock device that fixes the tailgate to the vehicle body by being engaged with the opening in a state that the tailgate is closed, wherein the wiper is connected with the lock device by a reinforcing member.

According to such a configuration, the wiper is connected with the lock device by the reinforcing member, which prevents the wiper from being separated from the lock device to fall inside or outside the vehicle, even if the tailgate is broken due to load input and the wiper comes off the tailgate so as to be separated.

Further, the reinforcing member is a metal wire member. According to such a configuration, the wire member is easily deformable and even if it is mounted by bending in consideration of expansion and contraction due to temperature change, the rear wiper can be held so as not to fall off.

Still further, a surface of the lock device facing in a vehicle inner/outer direction is in contact with a surface of the reinforcing member facing in the vehicle inner/outer direction, and a surface of the wiper facing in the vehicle inner/outer direction is in contact with a surface of the reinforcing member facing in the vehicle inner/outer direction.

According to such a configuration, if the tailgate is subjected to load input in the vehicle inner/outer direction, both ends of the reinforcing member can strongly resist the force which woks to disconnect the wiper from the lock device. Therefore, even if the wiper comes off an inner panel so as to be separated, the wire member can maintain the connection with a portion of the inner panel having relatively high attachment rigidity to where the lock device is fixed.

The lock device includes a metal lock case, the wiper includes a metal wiper case, and the reinforcing member connects the lock case with the wiper case.

According to such a configuration, a mount ring is clamped between a flange which integrally extends from the metal wiper case of the rear wiper and a seat surface of a wiper mount part by bolts and nuts.

Meanwhile, the other mount ring is mounted to the lock device having a metal housing via a mount piece of a metal lock stiffener in an open-box shape by bolts and nuts.

Therefore, the mount rings at both ends of the wire member are connected to the wiper case of the metal rear wiper having relatively high rigidity and a portion of the inner panel to which the housing as a lock case of the lock device and a lock stiffener are fixed. Thus, the mount rings are less susceptible to temperature change, to have no risk of unstable due to deformation of the mount parts.

Yet further, the tailgate includes a hinge mechanism that pivotally supports the tailgate at the opening of the vehicle body, and the lock device is connected with the hinge mechanism by a second reinforcing member.

According to such a configuration, the lock device is connected with lower ends of right and left hinge stiffeners which are integrally arranged in the right and left hinge mechanisms that pivotally support the tailgate so as to be opened and closed at will.

Therefore, even if the the tailgate is subjected to load input, and the rear wiper comes off the tailgate, the wire members keep the connection, effectively restraining the wiper from falling off the tailgate.

Furthermore, the tailgate includes the hinge mechanism that pivotally supports the tailgate at the opening of the vehicle body, and the wiper is connected with the hinge mechanism by a third reinforcing member.

According to such a configuration, the rear wiper is connected with the right and left hinge stiffeners by the third reinforcing member.

Thus, at either side in the vehicle width direction, the rear wiper is retained at two points (four points on both sides when the wire members are connected bisymmetrically). Therefore, even if the tailgate is subjected to load input, and the rear wiper comes off the tailgate, the wire members can maintain the connection, to effectively restrain the wiper from falling off the tailgate.

In addition, the reinforcing member is formed of a metal material in a plate shape.

According to such a configuration, the rear wiper is connected with the lock device, and the right and left hinge stiffeners by the reinforcing member made of a metal material in a plate shape.

The reinforcing member in a plate shape is made of a metal material, which is hard to be cracked and can deform easily to absorb load input. Further, even if a part of the reinforcing member is broken due to load input to the tailgate, the other part remains. Therefore, the wiper is connected continuously with the tailgate, to reduce the risk of the wiper falling off.

The reinforcing member may be formed of a chemical synthetic fiber material.

According to such a configuration, for example, if the reinforcing member is formed of a chemical synthetic fiber material as the same material as a seat belt, the weight of the reinforcing member can be reduced.

According to the present invention, a tailgate structure is provided that, if a resin tailgate is subjected to load input, prevents a wiper from falling off to protect passengers and to avoid a rear wiper from scattering outside the vehicle.

Objects, configurations and effects other than the description above will be apparent by the description of embodiments below.

DETAILED DESCRIPTION OF THE EMBODIMENTS

Figure 1:
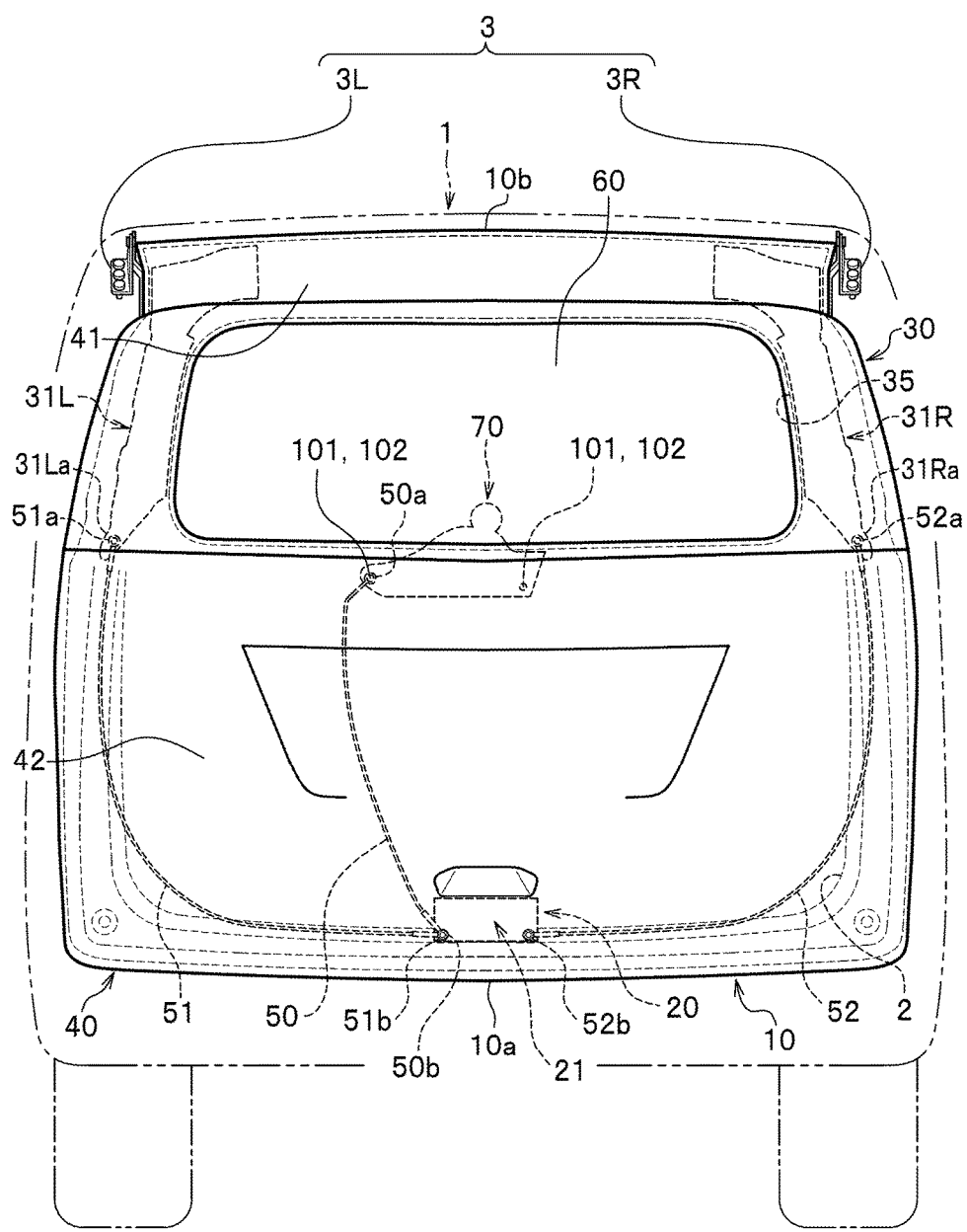
FIG. 1 is a front view of a tailgate structure, as seen from rearside of a vehicle of a present embodiment.

A description will be given of an embodiment of the present invention with reference to FIGS. 1 to 7. In the description, like reference numerals designate identical elements and a duplicate description will be omitted. Further, in terms of directions, it is referred to as front/rear, right/left and up/down directions, seen from a driver of a vehicle. Note that a vehicle width direction means the same as a right/left direction.

Figure 2:
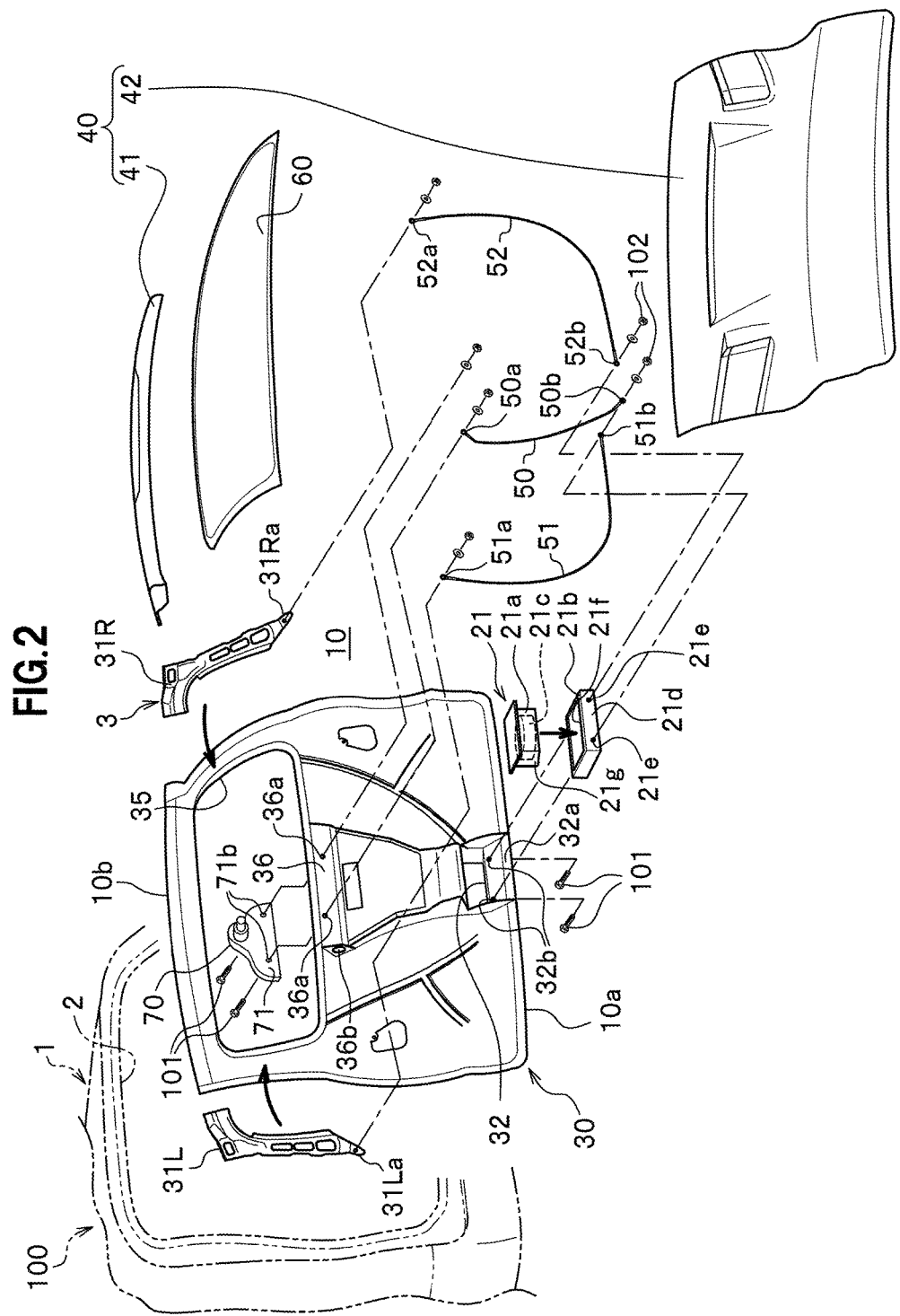
FIG. 2 is an exploded perspective view of the tailgate having the tailgate structure according to the present embodiment.
Figure 3:
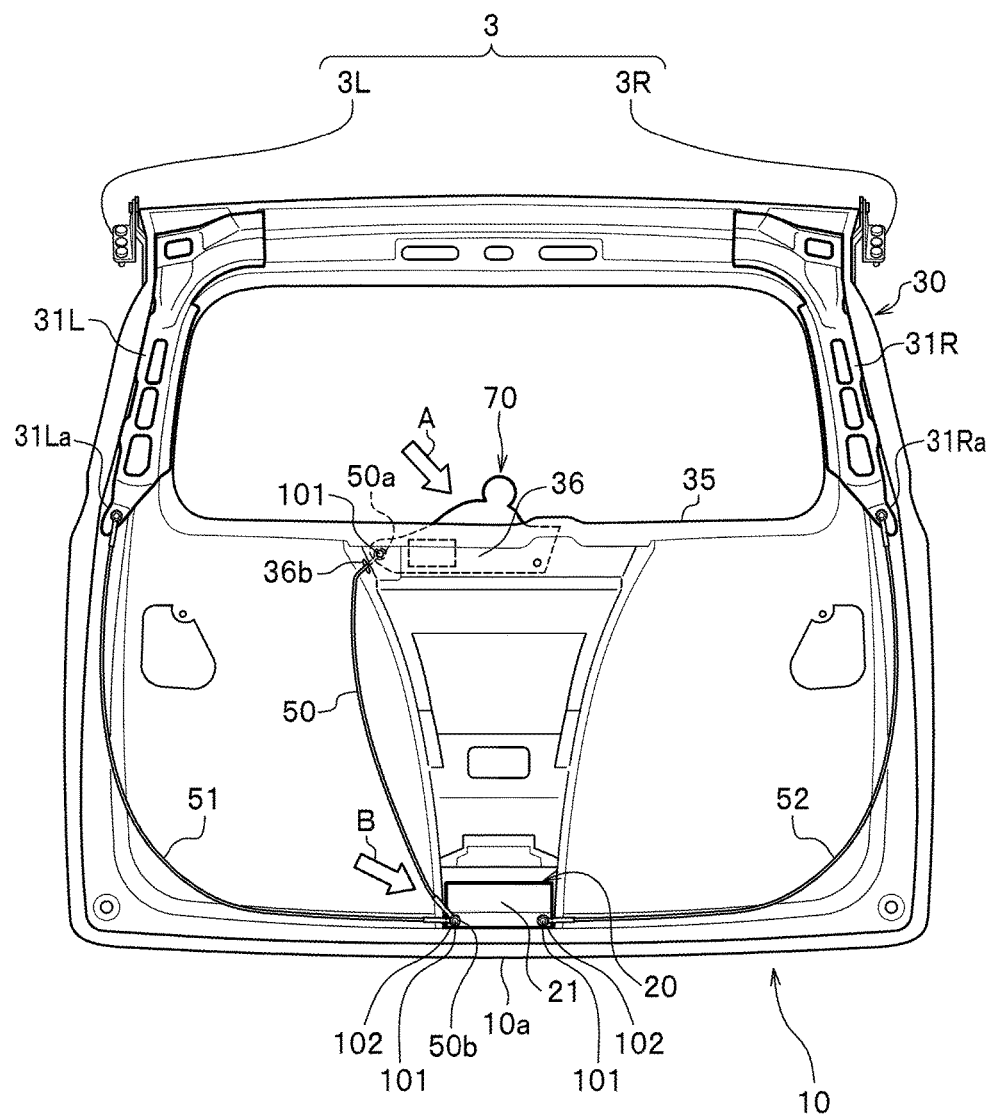
FIG. 3 is a front view of the tailgate structure of the present embodiment without an outer panel.

FIG. 1 is a front view of a vehicle rear part where a tailgate is opened according to the present embodiment. Further, FIG. 2 is an exploded perspective view of a tailgate structure according to the present embodiment. FIG. 3 is a front view of the tailgate structure of the present embodiment without an outer panel.

Figure 4:
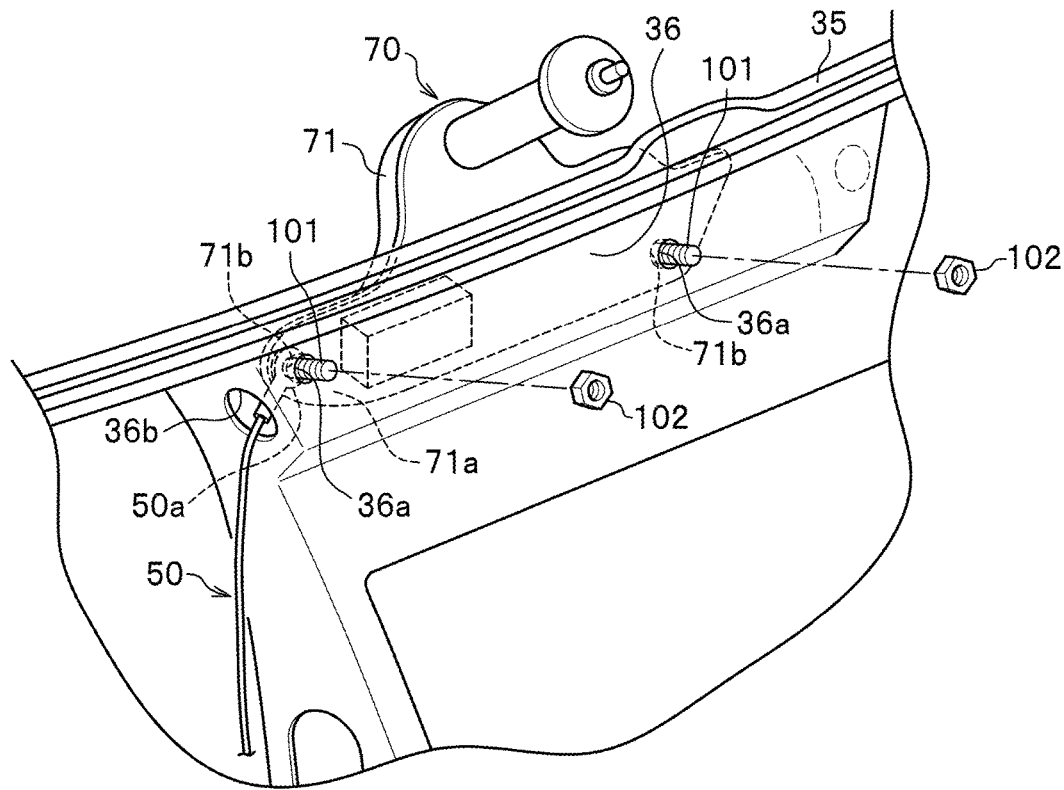
FIG. 4 is an enlarged perspective view of the tailgate structure of the present embodiment, as seen from an A-arrow in FIG. 3.

FIG. 4 is an enlarged perspective view of the tailgate structure of the present embodiment, as seen from an A-arrow in FIG. 3.

Figure 5:
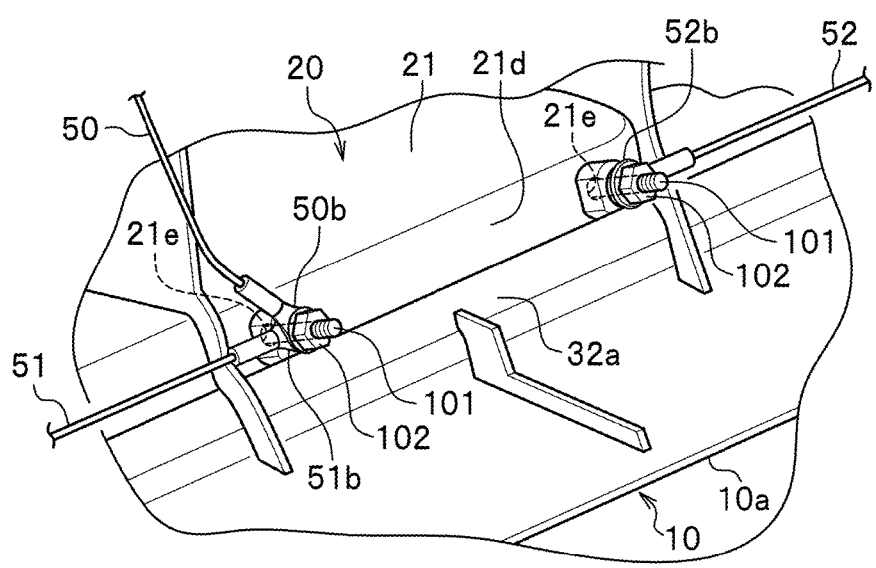
FIG. 5 is an enlarged perspective view of the tailgate structure of the present embodiment, as seen from a B-arrow in FIG. 3.

FIG. 5 is an enlarged perspective view of the tailgate structure of the present embodiment, as seen from a B-arrow in FIG. 3.

Still further, FIG. 6 to be described later is a front view of the tailgate structure of a first modification, showing a portion corresponding to that in FIG. 3. FIG. 7 is a front view of the tailgate structure of a second modification, showing a portion corresponding to that in FIG. 3.

As shown in FIG. 1, a tailgate 10 in the present embodiment is made of resin and includes a rear wiper 70 which wipes a rear glass panel 60 arranged in the tailgate 10. Further, the tailgate 10 includes a lock device 21 for securing the tailgate 10 to a vehicle body 1 in a state where the tailgate 10 is closed.

The rear wiper 70 is connected with the lock device 21 by a metal wire member 50 as a reinforcing member.

(Whole Structure of Vehicle Body)

As shown in FIGS. 1 and 2, an opening 2 is formed open at a rear part of a vehicle 100 according to the embodiment, and right and left hinge mechanisms 3R, 3L of a hinge mechanism 3 are fixed on an upper edge of the opening 2. The right and left hinge mechanisms 3R, 3L are rotatably supported about a rotational axis extending in an axial direction along a vehicle width direction, respectively, to allow the tailgate 10 to be freely rotated around an upper end 10b, so that the tailgate 10 is mounted so as to be opened/closed in a vehicle up/down direction.

(Structure of Tailgate)

The tailgate 10 of the present embodiment shown in FIG. 2 mainly includes an inner panel 30 made of resin, an outer panel 40 made of resin, a reinforcing member arranged between the inner panel 30 and outer panel 40, and the rear glass panel 60.

Among these members, the inner panel 30 has a lock device body 21a constituting the lock device 21 arranged securely therein via a box-like lock stiffener 21b of which upper surface is open. Further, right and left hinge stiffeners 31R, 31L of the hinge mechanism 3 and the rear wiper 70 are securely arranged in a glass opening 35 where the rear glass panel 60 of the inner panel 30 is mounted.

Further, the inner panel 30 made of resin is adhered in combination to the outer panel 40 made of resin. The outer panel 40 includes an outer panel upper member 41 to be attached to an upper side of the glass opening 35 of the inner panel 30, and an outer panel lower member 42 located under the the glass opening 35.

(Connection with Rear Wiper)

A description will be given of a reinforcing structure of the rear wiper 70 of the present embodiment, with reference to a front view shown in FIG. 3 in a state without the outer panel 40 and the rear glass panel 60, together with enlarged views in FIGS. 4 and 5.

In the tailgate structure of the present embodiment, a wiper mount part 36 is arranged to fix the rear wiper 70 in the center in the vehicle width direction at a lower end of the glass opening 35 of the tailgate 10 attached with the rear glass panel 60. Further, a lock opening 32 (see FIG. 2) is formed open in the center in the vehicle width direction of the inner panel 30 at a lower end 10a as one end of the tailgate 10, and the lock device 21 is fixed to a lower side 32a of the lock opening 32.

Even if the rear wiper 70 is separated from the inner panel 30, the wire member 50 as a reinforcing member connects the rear wiper 70 with the lock device 21, to prevent the rear wiper 70 from scattering.

The enlarged perspective view in FIG. 4 as seen from the A-arrow in FIG. 3 indicates how the wire member 50 is connected when the rear wiper 70 is fixed to the wiper mount part 36 of the inner panel 30.

A plurality of wiper mount holes 36a, 36a are formed around edges of a seat surface of the wiper mount part 36 arranged in the center in the vehicle width direction of a lower edge of the glass opening 35.

Then, one end of the wire member 50 is fastened together when the rear wiper 70 is firmly fixed to the inner panel 30 with bolts 101 and nuts 102 which penetrate though bolt insertion holes 71b, 71b of the rear wiper 70 and the wiper mount holes 36a, 36a.

The metal wire member 50 as a reinforcing member in the present embodiment has mount rings 50a, 50b in a ring shape integrally formed at both ends. The mount ring 50a formed at one end of the wire member 50 is passed through to an opposite side of the inner panel 30 (vehicle front side) via a wire insertion hole 36b which is formed open in the wiper mount part 36.

Then, the bolt 101 penetrates through the bolt insertion hole 71b formed in a flange 71a of the rear wiper 70, through a round hole formed at the center of the mount ring 50a arranged at one end of the wire member 50, and through the wiper mount hole 36a, to be fixed together by the nut 102.

In this state, the mount ring 50a is clamped between the flange 71a which integrally extends from a metal wiper case 71 and the wiper mount part 36 of which seat surface faces in the vehicle inner/outer direction. As a result, a surface facing in the vehicle inner/outer direction where the bolt insertion hole 71b is formed is in contact with a surface of the mount ring 50a facing in the vehicle inner/outer direction.

(Connection with Lock Device)

FIG. 5 is an enlarged perspective view of the tailgate structure of the present embodiment, as seen from the B-arrow in in FIG. 3.

The tailgate 10 includes the lock device 21 of the lock mechanism 20 in the center of one lower end 10a in the vehicle width direction. The lock mechanism 20 includes the lock device 21 and a striker (not shown) securely fixed to a lower edge of the opening 2 of the vehicle body. The lock device 21 is configured to engage with the striker in a state where the tailgate 10 is closed.

Further, the lock device 21 (see FIG. 2) mainly includes the lock device body 21a and the metal lock stiffener 21b in an open-box shape of which upper surface is open and which is integrally formed with the lock device body 21 to improve stiffness.

The lock stiffener 21b of the lock device body 21a has a predetermined strength as a functional component for locking with a metal housing 21g where the lock device body 21a is accommodated.

The lock stiffener 21b is combined with the housing 21g of the lock device body 21a in the vehicle up/down direction to be engaged together.

Further, mount holes 21e, 21e are formed in a mount piece 21d of the lock stiffener 21b. The bolts 101 for firmly fixing the lock device 21 to the inner panel 30 penetrate through insertion holes 32b, 32b formed open at the lower side 32a of the lock opening 32 of the inner panel 30 and the mount holes 21e, 21e formed open in the mount piece 21d of the lock stiffener 21b.

Further, the bolt 101 penetrates through the mount ring 50b of the wire member 50 so as to be screwed by the nut 102, so that the mount ring 50b is fastened together with the lock stiffener 21b to the lower side 32a.

Still further, a normal direction of the mount piece 21d of the lock device 21 coincides with the vehicle inner/outer direction. As a result, the mount piece 21d of the lock stiffener 21b facing in the vehicle inner/outer direction is in contact with a surface of the mount ring 50b facing in the vehicle inner/outer direction.

Thus, the mount rings 50a, 50b arranged at both ends of the wire member 50 are firmly fixed to the rear wiper 70 and the lock device 21 having predetermined strength, with their attaching surfaces facing in the vehicle inner/outer direction.

Therefore, even if the tailgate is subjected to load input in the vehicle inner/outer direction, the wire member 50 can strongly resist a force of disconnecting the rear wiper from the lock device 21.

Accordingly, even if the rear wiper 70 comes off the inner panel 30 so as to be separated, the wire member 50 can maintain the connection with a portion of the inner panel 30 having relatively high attachment rigidity to which the lock device 21 is fixed.

Mount rings 51b, 52b are arranged at one ends of the wire members 51, 52 as right and left second reinforcing members and fastened together by the bolts 101 and nuts 102 to the lock device 21 of the present embodiment for connection.

As shown in FIG. 1 or FIG. 2, the mount rings 51a, 52a at the other end of the right and left wire members 51, 52 are connected to lower ends 31Ra, 31La of the right and left hinge stiffeners 31R, 31L integrally extending from the right and left hinge mechanisms 3R, 3L.

Next, a description will be given of operational effects of the tailgate structure of the present embodiment.

In the tailgate structure of the present embodiment, the rear wiper 70 is connected with the lock device 21 by the wire member 50.

Therefore, even if the tailgate 10 is cracked by load input and the rear wiper 70 comes off the inner panel 30 so as to be separated, the wire member 50 is strained to prevent the rear wiper 70 from falling off so as to retain within a predetermined range. Therefore, there is no possibility for the rear wiper 70 to scatter outside the vehicle, and even if the tailgate 10 made of resin is subjected to load input, the rear wiper 70 can be prevented from falling off.

Further, the wire member 50 is connected with the lock stiffener 21b of the lock device 21 having relatively high attachment rigidity. Further, in the present embodiment, the lock stiffener 21b is connected with the right and left hinge stiffeners 31R, 31L as strength members by the wire members 51, 52 as second reinforcing members.

Therefore, even if the lock device 21 comes off so as to be separated along with the rear wiper 70, the wire members 51, 52 are strained to prevent them from falling off.

Further, if the tailgate 10 is divided into pieces by load input, the tailgate 10 can be prevented from opening.

Still further, in the present embodiment, as shown in FIG. 4, the flange 71a in a tongue shape integrally extends from the wiper case 71 of the rear wiper 70. Yet further, a seat surface of the wiper mount part 36 has a flat shape having the vehicle front/rear direction as a normal line.

The mount ring 50a of the wire member 50 is clamped between the flange 71a and the wiper mount part 36 so as to be in contact, with the surfaces facing each other, in an inner/outer direction of a boundary by being fastened together by the bolts 101 and nuts 102.

As shown in FIG. 5, a seat surface is formed around the mount holes 21e, 21e formed in the lock stiffener 21b in an open-box shape of the lock device 21. The seat surface has a flat shape having the vehicle front/rear direction as a normal line.

The mount ring 50b of the wire member 50 and the mount ring 51b of the wire member 51 are clamped between the nuts 102 fastened by the bolt 101 and the seat surface of the lock stiffener 21b, so as to be in contact, with the surfaces facing each other, in the inner/outer direction of the boundary.

Further, in the present embodiment, the fastening direction of the bolts 101 and nuts 102 coincides with the vehicle front/rear direction.

Therefore, if the tailgate 10 is subjected to load input in the inner/outer direction of the boundary (here, the vehicle front/rear direction), the wire member 50 can strongly resist a force of disconnecting the rear wiper 70 from the lock device 21, as compared with a case where the wire member 50 is connected in the vehicle up/down direction or the vehicle width direction.

Accordingly, the rear wiper 70 can maintain the connection with the lock device 21 by the wire member 50.

Note that, here, the inner/outer direction of the boundary is assumed to be the vehicle front/rear direction, but in a type of vehicle having large inclination of a tailgate, the inner/outer direction of the boundary inclines in accordance with the predetermined panel tilt angle which inclines in a vehicle upward direction, so as to be in contact, with the surfaces facing each other, in the inclined inner/outer direction of the boundary.

Further, the flange 71a of the wiper case 71 attached with the mount rings 50a, 50b of the wire member 50 and the lock stiffener 21b in an open-box shape are made of metal, to have favorable rigidity at portions to which the wire member 50 is attached, and to be insusceptible to deformation due to temperature change, so that the connection is stable.

In addition, since the wire member 50 is made of metal, as shown in FIG. 3, a bending amount of the wire member 50 and the like can be made minimal in consideration of temperature change. Therefore, the rear wiper 70 which has come off due to load input can be held (retained) as close as possible from the original position, to securely hold the rear wiper 70 within a predetermined range by the strained wire member 50.

(First Modification)

Figure 6:
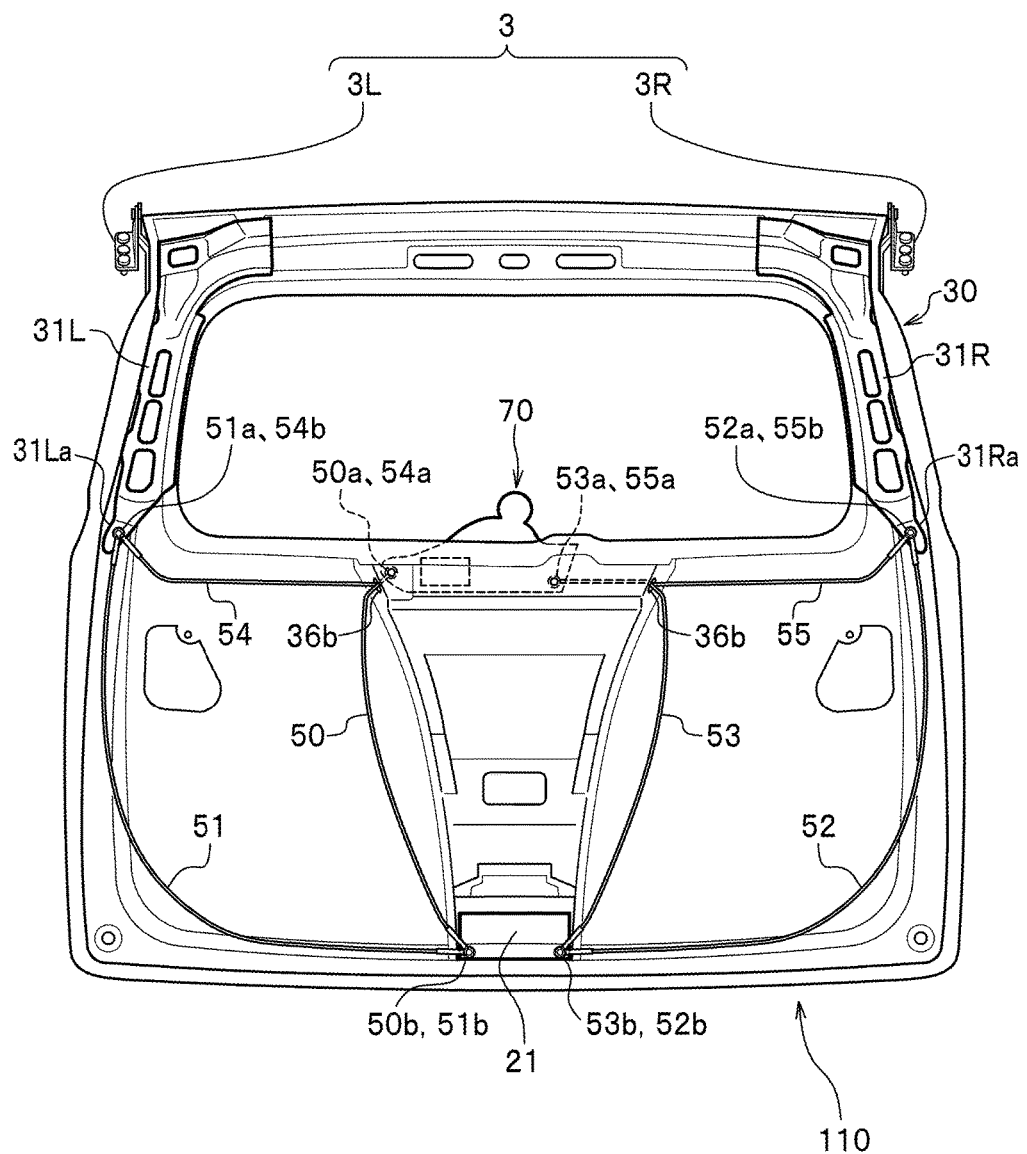
FIG. 6 is a front view of the tailgate structure of a first modification, showing a portion corresponding to that in FIG. 3.
Figure 7:
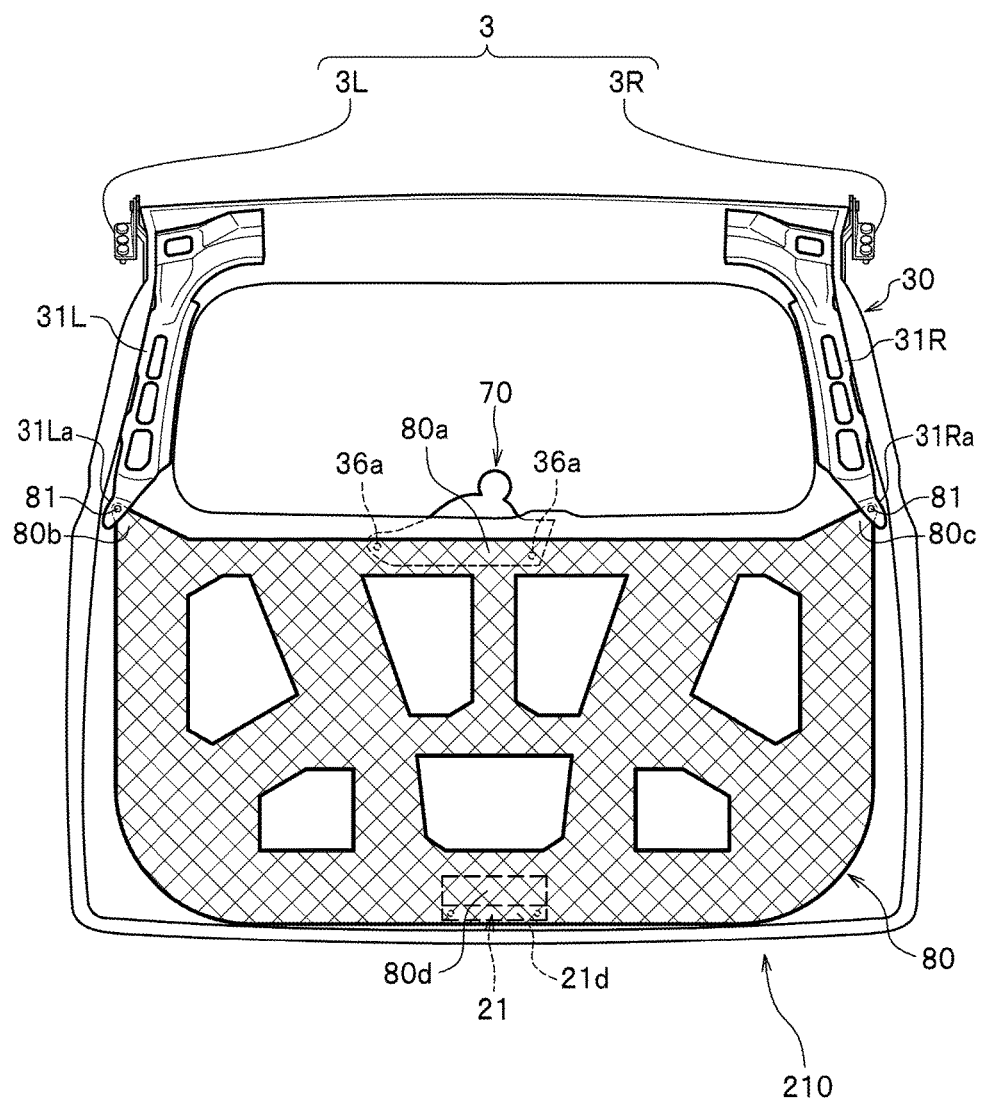
FIG. 7 is a front view of the tailgate structure of a second modification, showing a portion corresponding to that in FIG. 3.

FIG. 6 is a front view of a tailgate structure of a first modification of the present embodiment, showing parts corresponding to those in FIG. 3 of the present embodiment. Note that parts identical or equivalent to those in the above embodiment are given the same reference numerals, and the description thereof will be omitted.

A tailgate 110 of the first modification further includes, in addition to the structure of the tailgate 10 of the above embodiment, a wire member 53 at an opposite side in the vehicle width direction to form a pair in symmetry at both the right and left sides with the wire member 50. A mount ring 53a arranged at one end of the wire member 53 is connected to the rear wiper 70 and a mount ring 53b arranged at the other end is connected to the lock device 21.

Further, in the tailgate 110 in the first modification, the rear wiper 70 is connected with the right and left hinge stiffeners 31R, 31L of the right and left hinge mechanisms 3R, 3L by wire members 54, 55 as third reinforcing members.

In other words, mount rings 54a, 55a arranged at one ends of the wire members 54, 55 are connected to the rear wiper 70, and mount rings 54b, 55b arranged at the other ends are fastened together with the mount rings 51a, 52a of the wire members 51, 52, respectively, to the lower ends 31Ra, 31La of the right and left hinge stiffeners 31R, 31L.

In the tailgate 110 of the first modification configured in this manner, the rear wiper 70 is connected with the right and left hinge stiffeners 31R, 31L by the wire members 54, 55, in addition to the wire members 50 and 53. Thus, at either side in the vehicle width direction, the rear wiper 70 is retained at two points (four points on both sides).

Therefore, even if the tailgate 110 is subjected to load input, and the rear wiper 70 comes off the tailgate 110, the connection is maintained by the wire members 50, 53, 54, 55, to effectively suppress the rear wiper 70 from falling off the tailgate 110.

Note that, in the first modification as shown in FIG. 6, the wire members 51, 52 connect the lower ends 31Ra, 31La of the right and left hinge stiffeners 31R, 31L with the lock device 21. Accordingly, even if the lock device 21 or the right and left hinge mechanisms 3R, 3L come off the tailgate together with the rear wiper 70, the lock device 21 or the right and left hinge mechanisms 3R, 3L which have not come off the tailgate can maintain the connection with the rear wiper 70, to prevent the rear wiper 70 from scattering.

Other structures and operational effects are identical or equivalent to those of the above embodiment, and description thereof will be omitted.

(Second Modification)

FIG. 7 is a front view of a tailgate structure of a second modification of the present embodiment, showing parts corresponding to those in FIG. 3. Note that parts identical or equivalent to those in the above embodiments are given the same reference numerals, and the description thereof will be omitted.

A tailgate 210 of the second modification includes a reinforcing member 80 formed of a metal material in a plate shape, in place of wire members 50 to 55 in the above embodiments.

The reinforcing member 80 has a substantially rectangular shape in a planar view, and is composed of a member in a plate shape having substantially the same area as the outer panel lower member 42, to have a plurality of openings formed as hollows.

Further, an upper edge of the reinforcing member 80 is connected with the rear wiper 70 and the lower ends 31Ra, 31La of the right and left hinge stiffeners 31R, 31L, and a lower edge of the the reinforcing member 80 is connected to the lock device 21.

That is, in the center in the vehicle width direction of the upper edge of the reinforcing member 80, a wiper fixing part 80a is formed which is fastened together with the rear wiper 70 so as to be fixed to the inner panel 30. Further, at both sides in the vehicle width direction of the upper edge of the reinforcing member 80, hinge fixing parts 80b, 80c are formed. Still further, both right and left sides on the upper edge of the reinforcing member 80 are connected to the lower ends 31Ra, 31La of the right and left hinge stiffeners 31R, 31L by pin members 81, 81.

Yet further, in the center in the vehicle width direction of the lower edge of the reinforcing member 80, a lock fixing part 80d is arranged so as to be fastened together with the lock device 21.

Then, the wiper fixing part 80a of the reinforcing member 80 is connected to the rear wiper 70, the lock fixing part 80d is connected to the lock device 21, and further, the hinge fixing parts 80b, 80c are connected to the right and left hinge stiffeners 31R, and 31L. Thus, the rear wiper 70 is coupled with the inner panel 30 at the right and left ends in the vehicle width direction and at the vehicle lower side via the reinforcing member 80.

In the tailgate 210 of second modification configured in this manner, as shown in FIG. 7, the rear wiper 70 is connected with the lock device 21 and the right and left hinge stiffeners 31R, 31L by the reinforcing member 80 in a plate shape.

The reinforcing member 80 is made of a metal material, to be hardly cracked and easily deformed to absorb load input.

Further, even if a part of the reinforcing member 80 is broken due to load input to the tailgate 210, the other part remains, allowing the rear wiper 70 to be connected continuously with the tailgate 210. Therefore, the possibility for the rear wiper 70 to fall off the tailgate 210 can be reduced.

Other structures and operational effects are identical or equivalent to the above embodiments, and the description thereof will be omitted.

(Summary of Operational Effects)

In the tailgate 10 of the present embodiment, the rear wiper 70 is connected with the lock device 21 by the wire member 50. Therefore, even if the tailgate 10 is subjected to load input to be broken so that the rear wiper 70 comes off the inner panel 30 so as to be separated, the rear wiper 70 is kept in connection by the wire member 50 with the portion of the tailgate 10 having relatively high attachment rigidity to which the lock device 21 is fixed. Therefore, there is no possibility for the rear wiper 70 to fall off the tailgate 10.

Further, the wire member 50 is made of metal which is easily deformable, and if it is mounted by bending in consideration of expansion and contraction due to temperature change, the rear wiper 70 can be held in a range so as not to fall off.

Further, the surface of the wire member 50 facing in the vehicle inner/outer direction is in contact with the surface of the mount ring 50b facing in the vehicle inner/outer direction. In addition, the surface of the mount ring 50a facing in the vehicle inner/outer direction is in contact with the surface of the rear wiper 70 facing in the vehicle inner/outer direction.

Therefore, if the tailgate 10 is subjected to load input in the vehicle inner/outer direction, the both ends of the wire member 50 connected to face to each other can strongly resist a force of disconnecting the rear wiper 70 from the lock device 21. Accordingly, even if the rear wiper 70 comes off the inner panel 30 so as to be separated, the wire member 50 can maintain the connection with the portion of the inner panel 30 having relatively high attachment rigidity to which the lock device is fixed.

Further, the mount ring 50a is clamped by the bolts 101 and nuts 102 between the flange 71a, which integrally extends from the metal wiper case 71 of the rear wiper 70, and the seat surface of the wiper mount part 36.

Meanwhile, the mount ring 50b is mounted by the bolts 101 and nuts 102 to the lock device 21 having the metal housing 21g via the mount piece 21d of the metal lock stiffener 21b in an open-box shape.

Therefore, the mount rings 50a, 50b at both ends of the wire member 50 are connected to portions of the resin inner panel 30 where the housing 21g as a lock case of the lock device 21 and the lock stiffener 21b are fixed, all of which are made of metal and have relatively high rigidity. Thus, the mount rings 50a, 50b are insusceptible to temperature change, to have no possibility for the connection to be unstable due to deformation of the mount parts.

Furthermore, the lock device 21 is connected, by the wire members 51, 52 as the second reinforcing members, with the lower ends 31Ra, 31La of the right and left hinge stiffeners 31R, 31L which are integrally arranged in the right and left hinge mechanisms 3R, 3L which pivotally support the tailgate 110 so as to be opened and closed at will.

Therefore, even if the the tailgate 110 is subjected to load input, and the rear wiper 70 and the lock device 21 come off the tailgate 110, the wire members 51, 52 and 50, 53 keep the connection, to effectively suppress the rear wiper 70 from falling off the tailgate 110.

Further, in the first modification shown in FIG. 6, the rear wiper 70 is connected with the the lower ends 31Ra, 31La of the right and left hinge stiffeners 31R, 31L by the wire members 54, 55 as the third reinforcing members.

Therefore, at either side in the vehicle width direction, the rear wiper 70 is retained at two points (four points on both sides where the wire members 53 are further connected bisymmetrically). Therefore, even if the tailgate 110 is subjected to load input and the rear wiper 70 comes off the tailgate 110, the connection is maintained by the wire members 50, 53, 54, 55, to effectively suppress the rear wiper 70 from falling off the tailgate 110.

Further, in the second modification shown in FIG. 7, the rear wiper 70 is connected with the lock device 21, and the right and left hinge stiffeners 31R, 31L by the metal reinforcing member 80 in a plate shape.

The reinforcing member 80 in a plate shape is made of a metal material, to be hardly cracked and easily deformed to absorb load input. Further, even if a part of the reinforcing member 80 is broken due to load input to the tailgate 210, the other part remains. Therefore, the rear wiper 70 is connected continuously to the tailgate 210, to reduce the risk of the rear wiper 70 falling off.

Further, the reinforcing member 80 may be formed of a chemical synthetic fiber material. For example, if the reinforcing member 80 is formed of a chemical synthetic fiber material which is the same material used for a seat belt, the raw material is used in common, to inhibit the manufacturing cost from increasing.

Though the tailgate structure according to the present embodiments have been described in detail with reference to the drawings, the present invention is not limited thereto, and appropriate modifications may be made without departing from the spirit of the present invention.

For example, in the present embodiments, the metal wire members 50 to 55 have been used to connect members, but the present invention is not limited to a specific metal material, and the wire members may be formed of any metal material such as aluminum, stainless steel, and duralumin, as long as the material is metal.

Further, the first embodiment describes that the rear wiper 70 is connected with the lock device 21 by the single wire member 50, but, the rear wiper 70 may be connected with the lock device 21 by a plurality of wire members such as the wire members 50, 53 as shown in the first modification. Any functional component having a certain level of weight, such as a dynamic damper, may be used instead of the lock device 21 so as to be connected with the rear wiper 70 by the wire member 53.

Still further, the wire members 51, 52 as the second reinforcing members and the wire members 54, 55 as the third reinforcing members have been described, but the present invention is not particularly limited thereto. For example, the wire members 50 and 53 as the first reinforcing members and the wire members 54, 55 as the third reinforcing members may be used, and, as long as the wire members connect the rear wiper 70 with the lock device 21, the shape, quantity and material of the wire member 50 and the like are not particularly limited.

Further, the second modification describes the metal reinforcing member 80 in a plate shape, but the present invention is not limited to a specific metal material, and the reinforcing member 80 may be formed of any metal material such as aluminum, stainless steel, and duralumin, as long as the material is metal.

Still further, the wire members 50, 53 as first reinforcing members may be combined with the reinforcing member 80 in a plate shape, and the shape, quantity and material of the reinforcing member 80 are not particularly limited.

The reinforcing member may be formed of a chemical synthetic fiber material, instead of the metal wire members 50, 53 as the first reinforcing members or the reinforcing member 80 in a plate shape.

In this case, for example, the reinforcing member may be formed of the same chemical synthetic fiber material as that used for a seat belt, by using the material in common, to inhibit the manufacturing cost from increasing.

What is claimed is:

1. A tailgate structure comprising:
    a tailgate that is made of resin and is arranged in an opening of a vehicle body;
    a wiper that wipes a glass arranged in the tailgate;
    a lock device that fixes the tailgate to the vehicle body by being engaged with the opening in a state that the tailgate is closed, and
    a hinge mechanism that pivotally supports the tailgate at the opening of the vehicle body,
    wherein the wiper is connected with the lock device by a reinforcing member,
    the lock device is connected with the hinge mechanism by a second reinforcing member,
    the wiper is connected with the hinge mechanism by a third reinforcing member,
    the reinforcing member, the second reinforcing member, and the third reinforcing member are metal wire members, and
    the lock device is annularly connected with the hinge mechanism and the wiper by the reinforcing member, the second reinforcing member and the third reinforcing member.

2. The tailgate structure according to claim 1, wherein a surface of the lock device facing in a vehicle inner/outer direction is in contact with a surface of the reinforcing member facing in the vehicle inner/outer direction, and a surface of the wiper facing in the vehicle inner/outer direction is in contact with a surface of the reinforcing member facing in the vehicle inner/outer direction.

3. The tailgate structure according to claim 1, wherein the lock device includes a metal lock case, the wiper includes a metal wiper case, and the reinforcing member connects the lock case with the wiper case.

4. The tailgate structure according to claim 1, wherein a connecting portion between the lock device and the reinforcing member is away from an outer panel provided in the tailgate.

5. The tailgate structure according to claim 1, wherein a connecting portion between the wiper and the reinforcing member is away from an outer panel provided in the tailgate.

6. A tailgate structure comprising:
    a tailgate that is made of resin and is arranged in an opening of a vehicle body;
    a wiper that wipes a glass arranged in the tailgate;
    a lock device that fixes the tailgate to the vehicle body by being engaged with the opening in a state that the tailgate is closed, and
    a hinge mechanism that pivotally supports the tailgate at the opening of the vehicle body,
    wherein the wiper is connected with the lock device by a reinforcing member,
    the lock device is connected with the hinge mechanism by a second reinforcing member,
    the wiper is connected with the hinge mechanism by a third reinforcing member,
    the reinforcing member, the second reinforcing member and the third reinforcing member are metal wire members, and
    a length of the reinforcing member that connects the lock device with the wiper is longer than a distance between the lock device and the wiper.

7. The tailgate structure according to claim 6, wherein a surface of the lock device facing in a vehicle inner/outer direction is in contact with a surface of the reinforcing member facing in the vehicle inner/outer direction, and a surface of the wiper facing in the vehicle inner/outer direction is in contact with a surface of the reinforcing member facing in the vehicle inner/outer direction.

8. The tailgate structure according to claim 6, wherein the lock device includes a metal lock case, the wiper includes a metal wiper case, and the reinforcing member connects the lock case with the wiper case.

9. The tailgate structure according to claim 6, wherein a connecting portion between the lock device and the reinforcing member is away from an outer panel provided in the tailgate.

10. The tailgate structure according to claim 6, wherein a connecting portion between the wiper and the reinforcing member is away from an outer panel provided in the tailgate.

* * * * *